(12) United States Patent
Lew et al.

(10) Patent No.: US 9,356,907 B2
(45) Date of Patent: May 31, 2016

(54) MESSAGING SYSTEM HAVING MULTIPLE NUMBER, DUAL MODE PHONE SUPPORT

(75) Inventors: Eugene Lee Lew, Olney, MD (US); Gary M. Lauder, Atherton, CA (US); Vasileios John Gianoukos, Winchester, MA (US)

(73) Assignee: HeyWire, Inc., Cambridge, MA (US)

( * ) Notice: Subject to any disclaimer, the term of this patent is extended or adjusted under 35 U.S.C. 154(b) by 1083 days.

(21) Appl. No.: 13/441,104

(22) Filed: Apr. 6, 2012

(65) Prior Publication Data

US 2012/0226759 A1    Sep. 6, 2012

Related U.S. Application Data

(63) Continuation-in-part of application No. 13/111,109, filed on May 19, 2011, now Pat. No. 8,918,085, which is a continuation-in-part of application No. 12/535,323, filed on Aug. 4, 2009, now Pat. No. 8,694,031.

(Continued)

(51) Int. Cl.
*H04M 11/00* (2006.01)
*H04W 4/00* (2009.01)
(Continued)

(52) U.S. Cl.
CPC ............ *H04L 61/106* (2013.01); *H04L 12/588* (2013.01); *H04L 29/12896* (2013.01); *H04L 51/32* (2013.01); *H04L 61/605* (2013.01); *H04M 15/00* (2013.01); *H04M 15/8038* (2013.01); *H04M 15/8055* (2013.01); *H04M 15/8061* (2013.01); *H04M 15/8083* (2013.01);

(Continued)

(58) Field of Classification Search
CPC .................................. H04W 8/02; H04W 4/24
USPC ........................................ 455/406, 432.1, 466
See application file for complete search history.

(56) References Cited

U.S. PATENT DOCUMENTS 6,591,103 B1 *  7/2003  Dunn et al. ................... 455/436
6,757,365 B1     6/2004  Bogard
(Continued)

FOREIGN PATENT DOCUMENTS

WO     WO2007015075     2/2007

OTHER PUBLICATIONS

Int'l Search Report dated Sep. 24, 2009 from corresponding International Application No. PCT/US2009/052715.

(Continued)

*Primary Examiner* — Omoniyi Obayanju
(74) *Attorney, Agent, or Firm* — Chapin IP Law, LLC

(57) ABSTRACT

A social messaging hub provides communication services for a data enabled device having Internet network access capabilities. The social messaging hub communicates with the data enabled device over the Internet or cellular data networks, and interfaces with a message infrastructure including mobile carriers, message aggregators, message exchanges and various specialized social messaging services to enable bi-directional messaging communication. The user is given a registered phone number and unique IP addressable identification which serve as a source and destination identifier of the associated data enabled device. Messages may originate in or be delivered to other users' mobile telephones or in similarly equipped and provisioned IP data enabled devices. An application operating on the IP enabled device determines in conjunction with the social messaging hub a mode of transmission as a function of parameters including device location and destination of a message.

10 Claims, 12 Drawing Sheets

Related U.S. Application Data

(60) Provisional application No. 61/137,918, filed on Aug. 5, 2008, provisional application No. 61/164,705, filed on Mar. 30, 2009, provisional application No. 61/346,133, filed on May 19, 2010, provisional application No. 61/473,508, filed on Apr. 8, 2011, provisional application No. 61/473,542, filed on Apr. 8, 2011.

(51) Int. Cl.
| | |
|---|---|
| *H04L 29/12* | (2006.01) |
| *H04L 12/58* | (2006.01) |
| *H04W 4/20* | (2009.01) |
| *H04M 15/00* | (2006.01) |
| *H04W 4/24* | (2009.01) |
| *H04W 4/14* | (2009.01) |
| *H04W 8/26* | (2009.01) |
| *H04W 64/00* | (2009.01) |
| *H04W 76/02* | (2009.01) |
| *H04W 88/06* | (2009.01) |

(52) U.S. Cl.
CPC ............. *H04W 4/20* (2013.01); *H04W 4/206* (2013.01); *H04W 4/24* (2013.01); *H04L 12/589* (2013.01); *H04L 12/5895* (2013.01); *H04W 4/14* (2013.01); *H04W 8/26* (2013.01); *H04W 64/00* (2013.01); *H04W 76/02* (2013.01); *H04W 88/06* (2013.01)

(56) References Cited

U.S. PATENT DOCUMENTS

| | | | |
|---|---|---|---|
| 7,197,035 B2 | 3/2007 | Asano | |
| 7,263,076 B1 | 8/2007 | Leibovitz et al. | |
| 7,275,104 B1 | 9/2007 | Martinez et al. | |
| 7,343,168 B2 | 3/2008 | Valloppillil | |
| 7,380,022 B2 | 5/2008 | Tell et al. | |
| 7,437,413 B2 * | 10/2008 | Okuyama | H04L 29/00 379/93.27 |
| 7,446,655 B2 | 11/2008 | Jha et al. | |
| 7,499,704 B1 | 3/2009 | Bonner | |
| 7,564,958 B1 | 7/2009 | Contractor | |
| 7,606,568 B2 | 10/2009 | Gallagher et al. | |
| 7,693,535 B2 | 4/2010 | Dunko | |
| 7,734,908 B1 | 6/2010 | Kung et al. | |
| 7,860,525 B2 | 12/2010 | Parkkinen et al. | |
| 7,865,198 B2 | 1/2011 | Shin | |
| 2004/0076144 A1 | 4/2004 | Ishodoshiro | |
| 2004/0109452 A1 | 6/2004 | Takihiro et al. | |
| 2005/0148353 A1 | 7/2005 | Hicks et al. | |
| 2005/0277407 A1 * | 12/2005 | Ahn et al. | 455/414.1 |
| 2005/0288045 A1 | 12/2005 | Yang et al. | |
| 2006/0040610 A1 | 2/2006 | Kangas | |
| 2006/0142012 A1 | 6/2006 | Kirchhoff et al. | |
| 2006/0148495 A1 | 7/2006 | Wilson | |
| 2007/0066318 A1 | 3/2007 | Danzeisen et al. | |
| 2007/0073585 A1 * | 3/2007 | Apple et al. | 705/14 |
| 2007/0190978 A1 | 8/2007 | White et al. | |
| 2008/0043969 A1 | 2/2008 | Shi | |
| 2008/0140850 A1 * | 6/2008 | Gade et al. | 709/231 |
| 2008/0172496 A1 * | 7/2008 | Middleton et al. | 709/246 |
| 2008/0182563 A1 | 7/2008 | Wugofski et al. | |
| 2008/0263137 A1 | 10/2008 | Pattison et al. | |
| 2008/0293404 A1 | 11/2008 | Scherzer et al. | |
| 2009/0005005 A1 | 1/2009 | Forstall et al. | |
| 2009/0031232 A1 | 1/2009 | Brezina et al. | |
| 2009/0154434 A1 | 6/2009 | Tanaka et al. | |
| 2009/0156202 A1 | 6/2009 | Reiss et al. | |
| 2009/0186634 A1 | 7/2009 | Sureka et al. | |
| 2010/0029273 A1 * | 2/2010 | Bennett | H04W 8/26 455/435.2 |

OTHER PUBLICATIONS

Int'l Search Report dated Dec. 7, 2011 in corresponding International Application No. PCT/US2011/037190.

* cited by examiner

MESSAGING SYSTEM HAVING MULTIPLE NUMBER, DUAL MODE PHONE SUPPORT

CROSS REFERENCE TO RELATED APPLICATIONS

This application is a continuation in part of United States Patent Application having Ser. No. 13/111,109 entitled "SOCIAL MESSAGING HUB" filed May 19, 2011 that shares inventorship with the present application and which is a continuation in part of United States Patent Application having Ser. No. 12/535,323 entitled "SMS TECHNOLOGY FOR COMPUTERIZED DEVICES filed Aug. 4, 2009 that shares inventorship with the present application and which claims the benefit of U.S. provisional patent application Ser. Nos. 61/137,918, entitled "Apparatus and methods for TV social applications", filed Aug. 5, 2008, 61/164,705, entitled "SMS Technology for Computerized Devices", filed Mar. 30, 2009. This application claims the benefit of the filing date of: earlier filed United States Provisional Patent Application having Ser. No. 61/346,133 entitled "SOCIAL MESSAGING SYSTEM AND DEVICES," filed May 19, 2010 that shares inventorship with the present application, earlier filed United States Provisional Patent Application having Ser. No. 61/473,508 entitled "SOCIAL MESSAGING SYSTEM," filed, Apr. 8, 2011, that shares inventorship with the present application; and earlier filed United States Provisional Patent Application having Ser. No. 61/473,542 entitled "SOCIAL MESSAGING SYSTEM HAVING MULTIPLE NUMBER, DUAL MODE PHONE SUPPORT," filed, Apr. 8, 2011, that shares inventorship with the present application. The entire teachings and contents of these Patent Applications are hereby incorporated by reference herein in their entireties.

FIELD OF THE INVENTION

The present invention relates to messaging and communications, and to mobile telephony, text messaging, instant messaging, multimedia messaging, personal computers and data enabled digital devices.

BACKGROUND

People around the world are confronted by a number of communications and writing devices which have evolved relatively recently from the separate areas of telephone communications networks, wireless networks, television or cable networks, and computer networks and personal computers. The more recent devices—mobile phones with message/picture/video texting, personal digital devices for Internet browsing and computer-based blogging and social networking sites—have been shaped in part by the separate networks of origin, but the nature and capabilities of many of these now-ubiquitous devices have both converged, and also advanced quickly in different directions as the industries controlling each sector have capitalized on their market power, reservoir of legacy subscribers and, in some cases, regulatory barriers and proprietary network equipment and connection protocols, to introduce new consumer features, often employing developments from other consumer products, and aiming to lure subscribers by mimicking those products. However, in doing so, each industry has also been limited by its own equipment, data transfer speeds and connection abilities.

Thus, as digital imaging advanced and consumers learned to take and handle images and to attach the images to e-mail messages, imaging chipsets were incorporated into mobile telephones and the mobile phones were configured to display images and allow their transmission between phones. Text and message protocols allowed transmission of 'instant' messages, and coded standardized greetings and messages between phone users, filling a niche for immediate portable, personal communication that was not met by existing personal computer devices. Devices like the iPhone®, introduced in 2007 allowed a user to access his Internet-based email from his mobile phone via a specially-configured data connection with his mobile service provider, and to exchange content via wireless connection to his personal computer.

However, despite these developments blurring boundaries between the classical phone, mobile telephone, Internet, wireless and television or cable networks, there has not been a convergence. Rather, although industry and government groups have promoted interface standards for several different classes of data or communication, each industry has retained much of its special structure, and the devices served by an industry (such as mobile telephones) may find their feature set constrained by intrinsic limitations of bandwidth and connectivity, by available networking equipment base, and by the level of contractual cooperation agreements of its provider. The many different classes of communications systems now available, and the many separate provider networks in each class, have also required the development of new supporting entities, such as nationally- or internationally-extending registries, aggregators, exchanges and other entities, in order to affect timely transfer of data, messages and/or entertainment content. This second-level infrastructure imposes further constraints of the feasible, or economically feasible, set of features that a consumer may exercise. Thus, for example, mobile telephones have been augmented with a display and the ability to run small applications such as games, MP3 players, Internet browsers/applications and email retrieval, while personal computers have the capability to run larger programs, employ wireless connectivity and perform voice-over-IP (VoIP) Internet communications. Various special-purpose applications requiring cross-platform connections may be provided, or applications simulating cross-platform capabilities may be developed, by a service provider, such as a television-displayed chat session available for subscribers of a TV provider. However, many other personal devices while having large data capacity, ability to connect to another user device and ability to run entertainment apps, may entirely lack the mobile telephone electronic circuitry necessary for exchanging mobile messages with telephone users. Additionally, the delivery of messages in some social messaging systems is affected by limitations of carrier networks and international boundaries. It is therefore desirable to provide a system for enhanced communication between personal devices.

SUMMARY OF THE INVENTION

Enhanced communication between personal devices is achieved in accordance with one aspect of the invention by a system for communication with a data enabled device although lacking mobile phone hardware and software, includes Internet network access capabilities. Such data enabled devices include, but are not limited to, an iPod Touch®, iPad®, portable e-Reader, a personal computer, a portable game player, a game console, a laptop, a television settop receiver, a television set or a netbook computer. The user of a non-telephony data enabled personal electronic device or a data enabled telephony device (e.g., smartphone, iPhone) is given a registered phone number (or an additional phone number for data enabled telephony devices) which serves to identify the source device in messages originating from the user of service on the data enabled device. The phone number also serves to indicate destination in messages directed to the user of the service on the non-telephony data enabled device. Such messages may originate in mobile telephones of other users, or in similarly equipped and provisioned non-telephony or telephony data enabled devices of other users. A social messaging hub operates such that incoming mobile text messages/multi-media messages are transparently routed, locally or internationally, through existing Short Message Service/Multimedia Messaging Service/Enhanced Messaging Service SMS/MMS/EMS messaging infrastructures including messaging aggregation and delivery organizations, thus messaging bi-directionally between mobile phones and the user's non-telephony data device or smartphone. Instant messaging communications is also facilitated by the social messaging hub.

The registered phone number may be acquired through or serviced by a competitive local exchange carrier (CLEC), local exchange carrier (LEC) or other provider that is authorized to issue registered phone numbers, and the set of numbers so issued may be serviced by that carrier's network, or by a separate entity or sub-entity, herein called a network unaffiliated virtual operator (NUVO), that serves as the service provider to users and functions as a destination carrier to receive messages directed to its telephone numbers (i.e., the numbers assigned by the NUVO to the user's data enabled device) from the message aggregator or carrier and to provide an Internet interface for delivery of the messages to users' non-telephony devices. The NUVO operating the social messaging hub receives messages from the user's data device over the Internet and transmit the messages through a connection to entities in a messaging infrastructure (e.g., a message aggregator or a carrier), for delivery to the mobile phones or non-telephony or telephony data enabled devices of intended recipients. The NUVO also receives SMS/MMS messages, via the aggregator entity or carrier, when these are directed to the registered phone number of a user served by the NUVO, and transmits these messages to (or allows web access from) the user's non-telephony or telephony data enabled device or mobile phone over the Internet. In this manner, the non-telephony data enabled device, lacking a mobile telephony chip set or software, simulates the messaging abilities of a mobile phone. The non-telephony personal device is thus rendered SMS, MMS and EMS capable. For data enabled devices, the registered phone number may be seen as (and is sometimes referred to below as) a 'virtual' phone number, making the device addressable by mobile phones without the need for any special applications or software updates. When a data enabled mobile phone, is enabled by the NUVO, a secondary or alternative phone number to the one assigned by default can be used to send and receive messages separately under the NUVO phone number. This allows a user to operate two lines, for example with personal and business numbers, in a single mobile device, such as a smart phone.

In one embodiment, a technique for messaging communications with a data enabled device includes obtaining a plurality of unique identifiers, assigning to a user of the data enabled device a unique identifier from the plurality of unique identifiers, associating the unique identifier with a data enabled device identifier. The technique further includes registering the unique identifier to data enabled device identifier association in a database, receiving a message from a message source through a message service directed to the user's data enabled device having the registered unique identifier obtained from the message source, providing the message using the database to identify the destination of message to an inbound service, establishing a connection between a data enabled device and the inbound service and pushing the message from the inbound service to an application running on the data enabled device.

Such a technique, overcomes the limitations of carrier networks and international boundaries. Significantly, this technique provides a telephone number to the user, thus invoking many of the legal rights enjoyed by telephone subscribers in the user's jurisdiction. The service may appeal especially to parents who do not want their children to have mobile phones, but understand the value of texting and other messaging for the child's social life, enabling communications and educational development; or who wish to have each family member in a family plan service, but without the high costs associated with full mobile telephony plans. In this case, the virtual phone number may be viewed as a placeholder for later telephone service, for example when the child graduates beyond elementary school. From the provider perspective, because the use of a virtual phone number for addressing SMS/MMS/EMS messages neither requires nor involves the extensive tracking and routing infrastructure that supports mobile voice calling, but can be supported by a simple web-based server network, they may offer virtual number messaging services at attractive and affordable rates without incurring incremental capital requirements.

Indeed, all subscriber messages are transmitted over the Internet through one or more servers and a message aggregation entity in the messaging infrastructure, so the entire service may be set up as a small third party or outside NUVO, or as similarly small Internet-coupled server operation within an existing mobile carrier (or land-line) network. When offered by an existing mobile carrier to a subscriber with an existing mobile phone, the system enables a user to additionally log onto a web-based service to send and receive SMS/MMS messages with his PC or other data enabled device. Such a web-based service may also operate to send and receive messages identified by a user's land line phone number, even if the user's land line/fixed phone is not SMS/MMS/EMS capable. The social messaging hub may be configured to exchange user messages with common messaging entities, such as Microsoft Windows Live Messenger, AIM, Yahoo, GoogleTalk™, Twitter, Facebook and others, so that texting mobile phones and non-telephony data devices can enjoy substantially similar messaging capabilities. When offered by an existing mobile carrier to a subscriber with an existing mobile phone, the system enables a user to additionally use a secondary phone number simultaneously with his primary phone number to send and receive SMS/MMS/EMS messages with his mobile phone, in essence providing a duality of identifications on a single device.

An exemplary social messaging hub for Short Message Service/Multimedia Messaging Service/Enhanced Messaging Service (SMS/MMS/EMS) communications includes an SMS provider, a inbound service coupled to the SMS provider, a database coupled to the inbound service and a web server, a Representational State Transfer (REST) service coupled to the web server; and a data push server coupled to the REST service. In other aspects of the social messaging hub, the data push server includes an interface to a push notification server, a notification queue, and a queue listener. Another aspect of the social messaging hub, the messaging hub includes a common message conversation queue.

Advantageously the social messaging hub runs software for converting messages into the different formats and employed in each of the foregoing messaging environments, and may include software for filing and maintaining all the text/multi-media messages of a user for later or simultaneous access, transmission or retransmission to the user's blogs, Facebook and other contacts. The social messaging hub allows a user to send one message across several social networks via text messaging, instant messaging (IM) and other Internet protocol (IP) based messaging formats to multiple contacts in one operation.

A data enabled device (also referred to as the Wi-Fi/mobile device) having dual mode Internet network access capabilities operates with software to optimize cost and to efficiently display content or effect communications when traveling internationally away from a home locale or when using a limited data transmission plan. Internal software controls SMS transmission so as to minimize international text messaging charges, and preferably also establishes Internet connection via Wi-Fi connection for accessing content, such as advertising content, appearing on the device's display. For use in a foreign country, the device may be fitted with a SIM card of the foreign country carrier (a local SIM card) and operate as a normal mobile phone to receive local calls, while it is configured to automatically send SMS messages via Wi-Fi, or using data capabilities associated with the data local SIM card when Wi-Fi connectivity is unavailable.

Another embodiment implements multiple telephone numbers per single account/software client/hardware device. Since the invention of the telephone, there has typically been a 1-to-1 relationship: one telephone number and one device/account. Even with the introduction of software based applications on devices such as smartphones and PC's (e.g.—Skype), a secondary or multiple telephone numbers is possible on a single device, but requires different accounts and different software clients for each telephone number. In this embodiment, A social messaging hub for Short Message Service/Multimedia Messaging Service/Enhanced Messaging Service (SMS/MMS/EMS) communications includes an SMS provider, an inbound service coupled to the SMS provider, a database coupled to the inbound service and a web server, a Hub application operating on the web server and comprising a plurality of message services and a transmission mode selector, wherein the transmission mode selector comprises an ad controller. The system further includes a common inbox where messages addressed to multiple phone numbers and messages addressed to multiple accounts associated with an IP address are delivered to the common inbox.

Such a system enables the user to utilize multiple country or domestic telephone numbers (identities) on same account, software client and a single device. In addition, because the technique is IP-based in network technology, it is geographically independent of country borders (operate globally without consideration to factors such as roaming). This technique reduces costs to users and enables geographic independence.

The ability to utilize multiple telephone numbers and/or IP based address accounts on a single account/software/hardware device without having to setup or utilize different account/software clients/hardware device, including dual/multiple SIM devices while reducing message, transmission and data charges is desirable. In one embodiment, a technique for selecting a wireless device mode of transmission includes communicating with a messaging hub, determining an identity of the wireless device, determining a location of the wireless device and determining a mode of transmission to reduce transmission charges. The technique further includes determining a destination of an SMS message and notifying the messaging hub to delay sending advertising content. Such a technique can reduce the costs associated with sending and receiving SMS text messages.

Embodiments of the invention include any type of computerized device, workstation, handheld, tablet or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Other embodiments of the invention that are disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor and a display, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein. Other configurations include web applications, browsers, IP applications and data enabled device applications as will be explained in more detail.

It is to be understood that the features of the social messaging hub can be embodied strictly as a software program, as software and hardware, or as hardware alone such as within a single processor or multiple processors, or within an operating system or within a software application.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention. These and other features of the invention will be understood from the description and claims herein, taken together with the drawings of illustrative embodiments, wherein

DETAILED DESCRIPTION

A social messaging hub combines text, chat and IM across multiple screens and enables users to access social media via SMS from anywhere in the world. The social messaging hub enables users to stay socially connected via social media sites regardless of their geographic location. The social messaging hub enables users to seamlessly interact with their favorite social sites and communication platforms.

Figure 1:
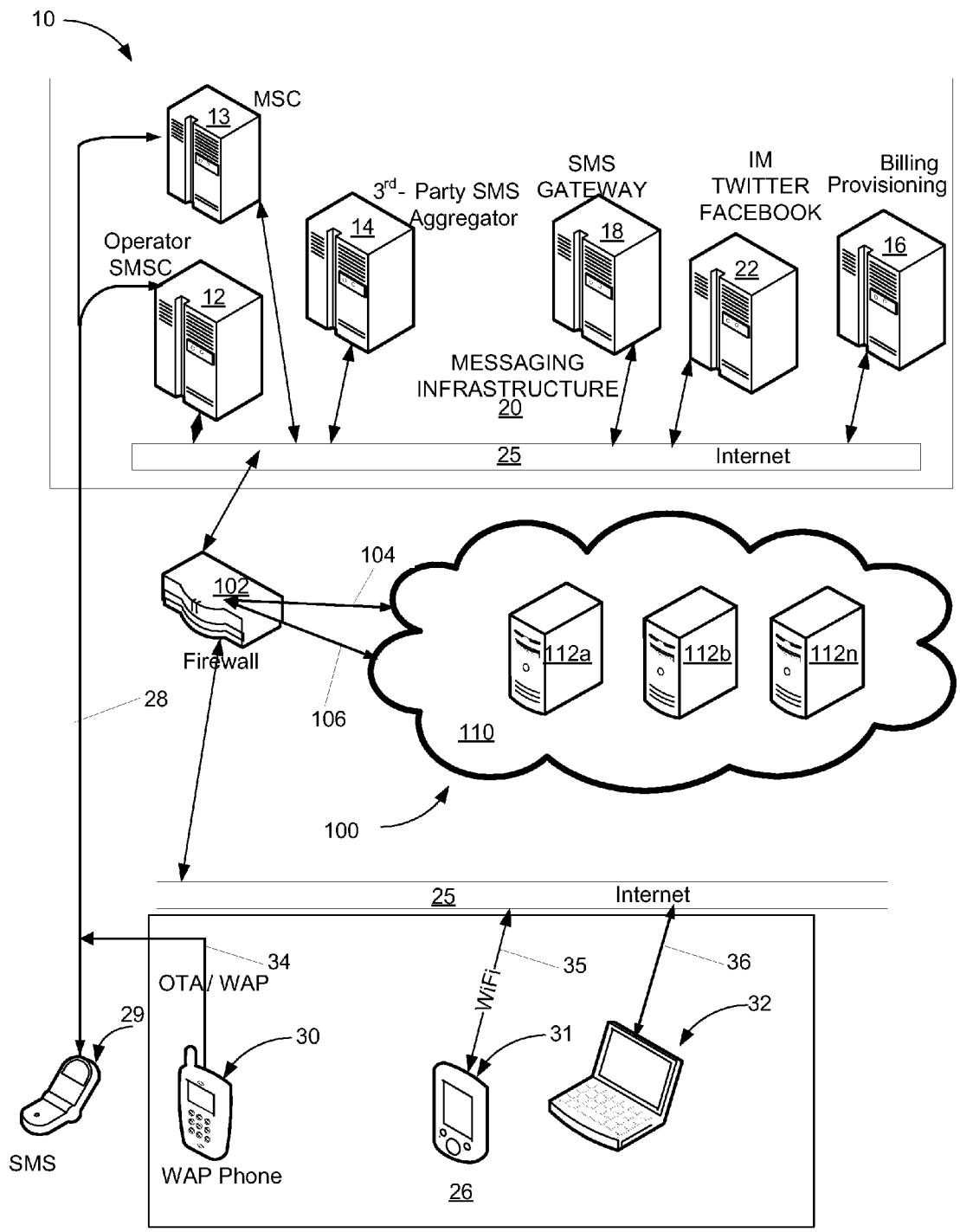
FIG. 1 is a schematic illustration of a social messaging hub and network environment/messaging infrastructure in accordance with one example embodiment disclosed herein.

Now referring to FIG. 1, an exemplary social messaging hub 100 operates in network environment 10 which includes messaging infrastructure 20. The social messaging hub 100 includes one or more processors 112a-112n and is coupled to the network environment 10 and messaging infrastructure 20 through a firewall 102. The firewall 102 is typically located at a social messaging hub 100 hosting facility.

The messaging infrastructure 20 includes, but is not limited to, a Short Message Service Center (SMSC) 12, a third party SMS aggregator 14 (also referred to a SMS aggregator 14), a billing and provisioning system 16, an SMS Gateway (SMS-GW) 18, social messaging gateways 22 and a cellular phone infrastructure 28. Other components of the messaging infrastructure 20 include a Mobile Switching Centre (MSC) 13 and additional SMS-Gateways and other SMSCs and billing and provisioning systems provided by additional mobile carrier service providers (not shown). The SMSC 12 and the billing and provisioning system 16 are typically operated by a mobile carrier service provider. The MSC 13 is also typically operated by a mobile carrier service provider. The social messaging gateways 22 include connections to IM services, for example AOL instant messenger (AIM), Yahoo Messenger, Windows Live Messenger Jabber, Skype, Tencent QQ, ICQ and GoogleTalk (gTalk), and other social networks such as Facebook and Twitter.

In one embodiment, the social messaging hub 100 communicates with the systems in the messaging infrastructure 20 (e.g., SMSC 12, the third party SMS aggregator 14 and the billing and provisioning system 16) using various network protocols including the Short Message Peer-to-Peer (SMPP) protocol, Signaling Transport (SIGTRAN) protocol or SS7 protocol. The SMPP protocol is a telecommunications industry protocol for exchanging SMS messages between SMS peer entities.

In this embodiment, the link between the social messaging hub 100 and the messaging infrastructure 20 is secured by the firewall 102 using, for example, a virtual private network (VPN) connection with HTTPS using 1024 bit (3DES-SHA1) encryption. Messages are transferred over SMPP link 104 and provisioning and single sign on (SSO), XML and SOAP messages and other control traffic are interchanged over control link 106. In another embodiment, messages are transferred over SIGTRAN (SS7 over IP) depending on the connection (e.g., a connection to a European Mobile Operator).

The social messaging hub 100 is connected via the Internet 25 or a dedicated connection to the messaging infrastructure 20 that relays messages between existing customer equipment, for example, a mobile phone 29, a data enabled mobile phone 30, a data enabled WiFi phone 31 and other data enabled devices (not shown) such as a laptop, netbook, tablet and a smart phone. The mobile phone 29 can be connected to the social messaging hub 100 over the cellular phone infrastructure 28 through the SMSC 12 using an SMS protocol. The MSC 13 is also connected to the cellular phone infrastructure 28. The data enabled mobile phone 30 can be connected to the social messaging hub 100 over the cellular phone infrastructure 28 using a data connection provided by OTA/WAP protocols. A data enabled WiFi phone 31 can be connected to the social messaging hub 100 via a WiFi connection to the Internet. It is understood that a mobile phone can be data enabled via both a WAP connection and a WiFi connection. The data enabled WiFi phone 31 is sometimes referred to as a dual mode phone if it can also connect over WAP. As referred to herein, a "non-telephony" device is a data enabled device which does not incorporate mobile phone hardware and software and which sends and receives SMS messages over a IP channel in contrast to mobile phone 29 which sends and receives SMS messages over standard cellular phone control channel.

A laptop personal computer 32 can be connected to the social messaging hub 100 via a wired Internet 25 connection 36 or a wireless Internet connection (not shown). Other mobile/portable data enabled devices (not shown) include but are not limited to a portable media players, personal digital assistants, Wi-Fi mobile platforms, pad-tablet computers, portable e-Readers, personal computers, portable game players, game consoles and netbook computers which can be connected to the social messaging hub 100 via the Internet 25 using a WiFi, wired or other wireless connection. These devices, the data enabled mobile phone 30 and the data enabled WiFi phone 31 are collectively referred to as adata enabled device 26 or devices 26 and these devices generally establish an Internet protocol (IP) session or connection with the social messaging hub 100. Some data enabled devices 26 interface with the social messaging hub 100 using a client browser 37 and other data enabled devices 26 interface with the social messaging hub 100 using a client software component (also referred to as a client application or simply "app"). The client browser 37 communication to a corresponding web application and the client application (app) are collectively referred to as application 40.

In operation and as described below in more detail, the social messaging hub 100 obtains a plurality of unique identifiers which in one embodiment, are telephone numbers acquired through or serviced by a competitive local exchange carrier (CLEC), local exchange carrier (LEC) or other provider that is authorized to issue or service registered phone numbers, and the set of numbers so issued may be serviced by that carrier's network, another carrier network or by a separate entity or sub-entity such as a network unaffiliated virtual operator (NUVO), that serves as the service provider to users and functions as a destination carrier to receive messages directed to its telephone numbers from the SMS aggregator 14, an SMS operator (e.g., a mobile carrier), a content provider or another NUVO, and to provide an Internet interface for delivery of the messages to users' data enabled devices 26.

The social messaging hub 100 assigns a user of a data enabled device 26 a unique identifier from the plurality of unique identifiers and the social messaging hub 100 associates the unique identifier with a data enabled device identifier. The data enabled device identifier includes but is not limited to a network address, a Unique Device Identifier (UDID), a Media Access Control address (MAC address), a International Mobile Equipment Identity (IMEI), a Mobile Equipment Identifier (MEID), a Electronic Serial Number (ESN)

and a CPU serial number, of the data enabled device 26. The social messaging hub 100 registers the association between the unique identifier with a data enabled device identifier in a database. After the user is assigned a unique identifier, a userid and password is when the application 40 is started. When the user registers the enabled device 26 and signs-in to an IM service or social media account (e.g., AIM, Yahoo Messenger, Windows Live Messenger and GoogleTalk, Facebook, Twitter, etc.) the account information is stored, in certain embodiments, on the user's data enabled device in a mini database for app. Previously stored login/signon information can be retrieved in order to sign on the user automatically.

In one embodiment, the user is given a registered phone number and unique IP addressable identification. The IP addressable identification is a connectionless method by which the user supplied email address, supplied as part of the registration process for contact purposes, is combined with the unique registered phone number. By affecting such a combination of two unique identifiers, each supplied by separate parties, a unique identification is created that can be located in a connectionless manner on the Internet.

For inbound messages (i.e., sent to the data enabled device 26), the social messaging hub 100 receives the text message from the messaging infrastructure 20 (e.g., message service SMSC 12, or SMS aggregator 14). The message is directed to the user's data enabled device 26 having the registered unique identifier obtained from the text message source, and the social messaging hub 100 provides the message to an inbound service, establishes a connection between a data enabled device 26 and the inbound service and pushes the text message from the inbound service to an application or web browser running on the data enabled device 26.

For outbound messages (i.e., sent from the data enabled device 26). the social messaging hub 100 receives the text message from the data enabled device 26 including a destination identifier for the message, processing the message and provide the message to SMS destination through the messaging infrastructure 20 (e.g., SMSC 12, or SMS aggregator 14) for delivery to the message recipient.

The social messaging hub 100 can submit multiple messages in one transmission using a 1 to many feature in conjunction with the application 40 (i.e., web client or smart phone app). The social messaging hub 100 transfers messages between data enabled devices 26 without the use of the message infrastructure 20 even if phone numbers are used as the addresses. Provisioning and SSO are incorporated in the social messaging hub 100 such that once a registered phone number and other user information is stored in database 126 connections and logins can be established automatically.

As described below in conjunction with FIGS. 2-5, the social messaging hub 100 may be configured to interface and exchange messages with various specialized social messaging services, such as AIM, Yahoo Messenger, Windows Live Messenger, GoogleTalk, Facebook, Twitter, as well as SMS/MMS-capable mobile phones and smart phones, and operates such that incoming mobile text messages are transparently routed, locally or internationally, through existing SMS/MMS delivery organizations in the messaging infrastructure.

More generally, embodiments of the social messaging hub 100 include an application which enables a user (sometimes referred to herein as a subscriber) to perform SMS/MMS/EMS or chat activities using a data enabled device 26, such as an iPod Touch, iPad, portable e-Reader, a personal computer, a portable game player, a game console, a laptop, a television set or a netbook computer, all of which can connect to the Internet. Messaging is carried out bi-directionally between the data enabled device 26 (non-telephony device, smartphone or other data devices) and other SMS capable devices. The social messaging hub 100 is implemented without any add-ons, that is, without requiring the user to attach accessory electronic devices, and is implemented via a the social messaging hub 100 that maintains an Internet connected server that interfaces with certain wireless messaging facilities in the messaging infrastructure 20 to establish device-to-wireless communications. In different embodiments, the social messaging hub 100 may be a separate dedicated entity, or may be a service entity set up within a mobile service provider to service data enabled devices 26 of some of the provider's subscribers. Further, the social messaging hub 100 may provide applications for managing the address books, messages and account information of the user.

When the social messaging hub 100 is a separate message service center entity, the social messaging hub 100 operations may be incorporated by one or more mobile providers to extend their subscriber service capabilities and the provider entity may provide dedicated connections for affecting coordination between services, call logs and billing for the affected accounts.

Features of the social messaging hub 100 may be provided within, or as external hosting services communicating with an existing mobile network provider as a web based application using advanced web capabilities, and may be configured to handle all forms of messaging for the subscribers. In such embodiments, a web client application provides the user with a single integrated interface wherein the subscriber can view or send SMS/MMS/EMS messages, tweets (integrated with Twitter), chat (for which the system supports MSN or AIM or Yahoo or GoogleTalk or Facebook or other similar IM service as the chat client), or status, for example Facebook Status. Subscription/Unsubscription operations can be performed from a web client running on any data enabled device 26 that supports standard Internet browsers or from IP based applications.

Figure 2:
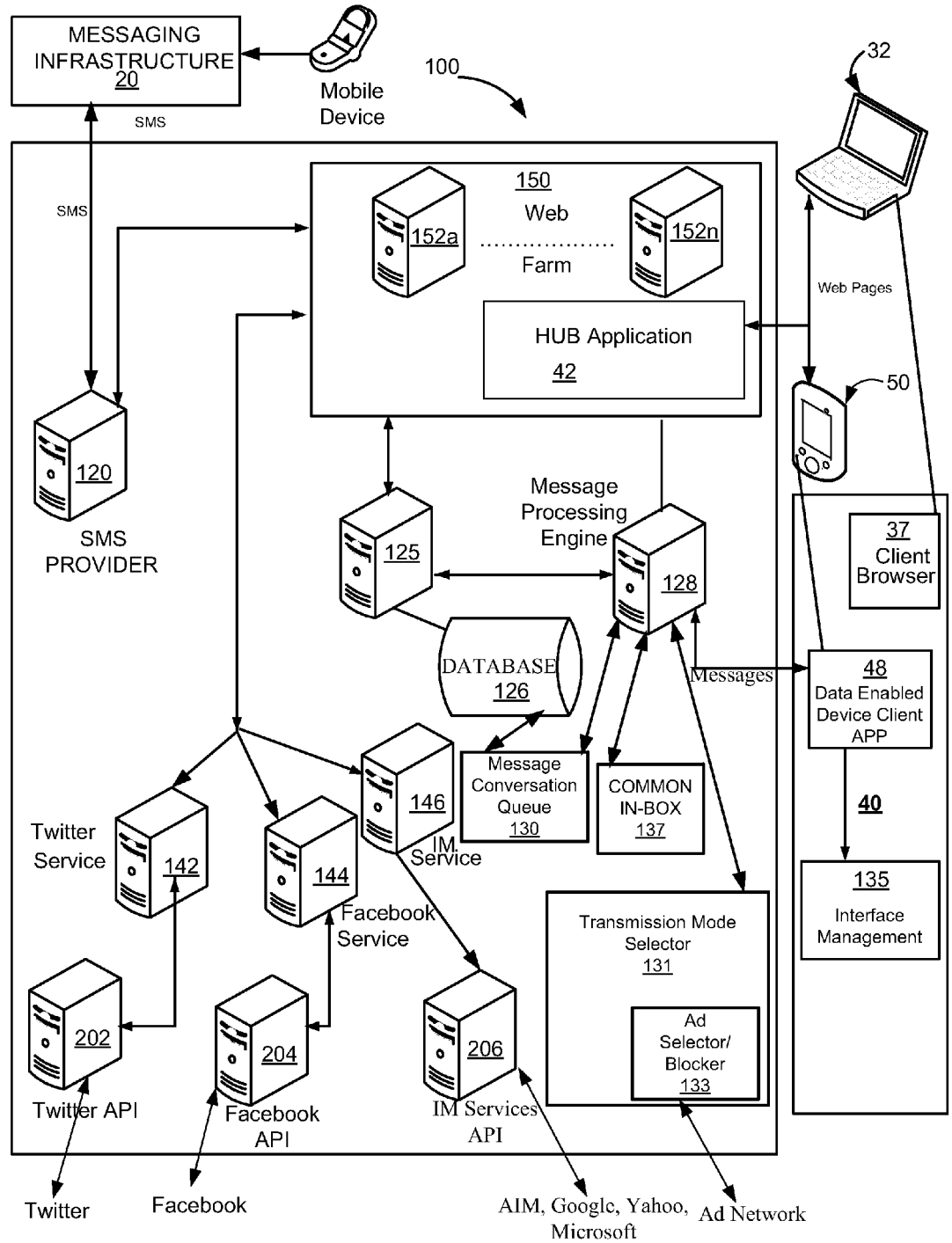
FIG. 2 is a schematic illustration of the social messaging hub of FIG. 1 including an embodiment of a system configured for multiple messaging providers.

FIG. 2 illustrates the architecture of one embodiment of the social messaging hub 100 for multiple messaging applications. The social messaging hub 100 includes an SMS provider 120 which provides the interface to the messaging infrastructure 20 and in particular in one embodiment to the SMSC 12, SMS aggregator 14 and (SMS-GW) 18. The SMS provider 120 is used to send and receive SMS/MMS/EMS messages respectively to and from: a mobile phone 29 through the cellular phone infrastructure 28 and a data enable device 26 shown here as laptop personal computer 32 and a smart phone 50.

The SMS provider 120 is interfaced to a web farm 150 having one or more servers 152a-152n (collectively referred to as web server 152). The servers 152a-152n store the SMS/MMS/EMS messages received and SMS/MMS/EMS messages to be delivered in conjunction with database server 125 and database 126. The servers 152a-152n also support a Hub application 42 which runs in conjunction an application 40 on data enabled device 26, here laptop 32 or smart phone 50. The web farm 150 is coupled to a database server 125 and corresponding database 126 which is used to store user information including the association between the assigned unique identifiers and data enabled device identifiers.

The social messaging hub 100 further includes a common message conversation queue which is interfaced to the database 126 and the message processing engine 128. The social messaging hub 100 further includes a Twitter service 142 connected to a Twitter application programming interface (API) 202, a Facebook Service 144 connected to a Facebook API 204, and an IM Service 146 connected to an IM services API 206. The Hub application 42 provides support the Twitter service 142, the Facebook Service 144 and the IM Service 146 and connection from these services to the applications 40 (including browsers 37 and apps 48) running on the data enabled devices 26.

The database server 125 is connected to a message processing engine 128 which has an associated message processing database 136. Database server 125 in conjunction with database 126 primarily stores SMS messages and certain user information and it is used when interfacing to the messaging infrastructure 20. Database 136 is used in conjunction with other messaging functions such as IM, Chat, etc.

The components of the social messaging hub 100, in one embodiment, are developed in C, C++, JAVA® or other suitable programming language, and include web servers, such as Apache, Microsoft Internet Information Services platform (IIS) or other suitable server systems operating on a UNIX, Microsoft or other operating system platform to store and communicate messages to Internet devices. An exemplary software framework for the social messaging hub 100 includes the following:

The Hub application 42 on servers 152a-152n runs on a .Net framework and is hosted on a Microsoft IIS7 system on a windows 2008 server.

The database 126 is a relational database implemented in this embodiment using a 2008 SQL Server, and the message processing engine 128 is implemented as a COMET server, using Frozen Mountain's COMET engine (using .net framework on IIS7).

The SMS provider 120 is a C++ server application which interacts with the messaging infrastructure 20.

The Twitter service 142 is a .Net WCF based service which communicates with Twitter via a Twitter API 202 to provide the Twitter feed to the applications 40.

Implementations for specific social messaging entities and devices are schematically illustrated in FIG. 2 which, for purposes of discussion, reference the above-described software and other communications elements. It is understood, however, that the servers, interfaces and other hardware and software elements of each system may vary within a broad range, so long as the system is well integrated with its operative components and is configured to communicate effectively with the other messaging entities involved.

In operation, the SMS provider 120 determines from the destination of a received message where to route the message through the messaging infrastructure 20. The message may be routed through to one of the SMSC 12, the SMS aggregator 14 the (SMS-GW) 18 or other communications entity, operated by a mobile operator, aggregator or some other intermediary.

The social messaging hub 100 consolidates message delivery into a common message conversation queue 130 and intermixes messages from other messaging services, including presence activity and geographic location data into the common message conversation queue 130. This consolidation, allows the social messaging hub 100 to enable personal replies to be threaded back to the user's social inbox so individual chat conversations can continue across multiple data enabled devices to provide multi-screen messaging. Texting conversations follow users from the Facebook App to their smartphone or tablet and vice versa. A user can read a message from anywhere and respond on any device with the same phone number. Chat based systems, such as Facebook, are operated using the common message conversation queue 130 to facilitate combined common message conversations.

When used to support multiple mobile network providers, advantageously, the social messaging hub 100 is configurable for each provider. An instance of the social messaging hub 100 is set up for each provider and includes separate instances of the database 126, Twitter service 142, Facebook service 144, IM services 146, message processing engine 128 and the SMS provider 120. It is understood that the various server functions of the social messaging hub 100 could be run on a single computer or multiple computers, storage could be provided by individual storage media or a storage area network.

The social messaging hub 100 includes a transmission mode selector 131 which operates in conjunction with the message processing engine 128 and an interface management program 135 of the smart phone client/app 48 to select a mode of transmission as a function of user preferences, user location and other parameters as described below in further detail in conjunction with FIGS. 11 and 12. The transmission mode selector 131 also operates to control transmission of mobile advertisements in conjunction with an ad selector/blocker 133 which is also coupled to the message processing engine 128 and a real time ad network. The operation of the ad selector/blocker 133 is described below in further detail. The social messaging hub 100 includes a common inbox 137 which collects messages directed to several numbers (phone numbers, IP addresses and email addresses). The operation of the common inbox 137 is described below in further detail in conjunction with FIG. 10.

Figure 3:
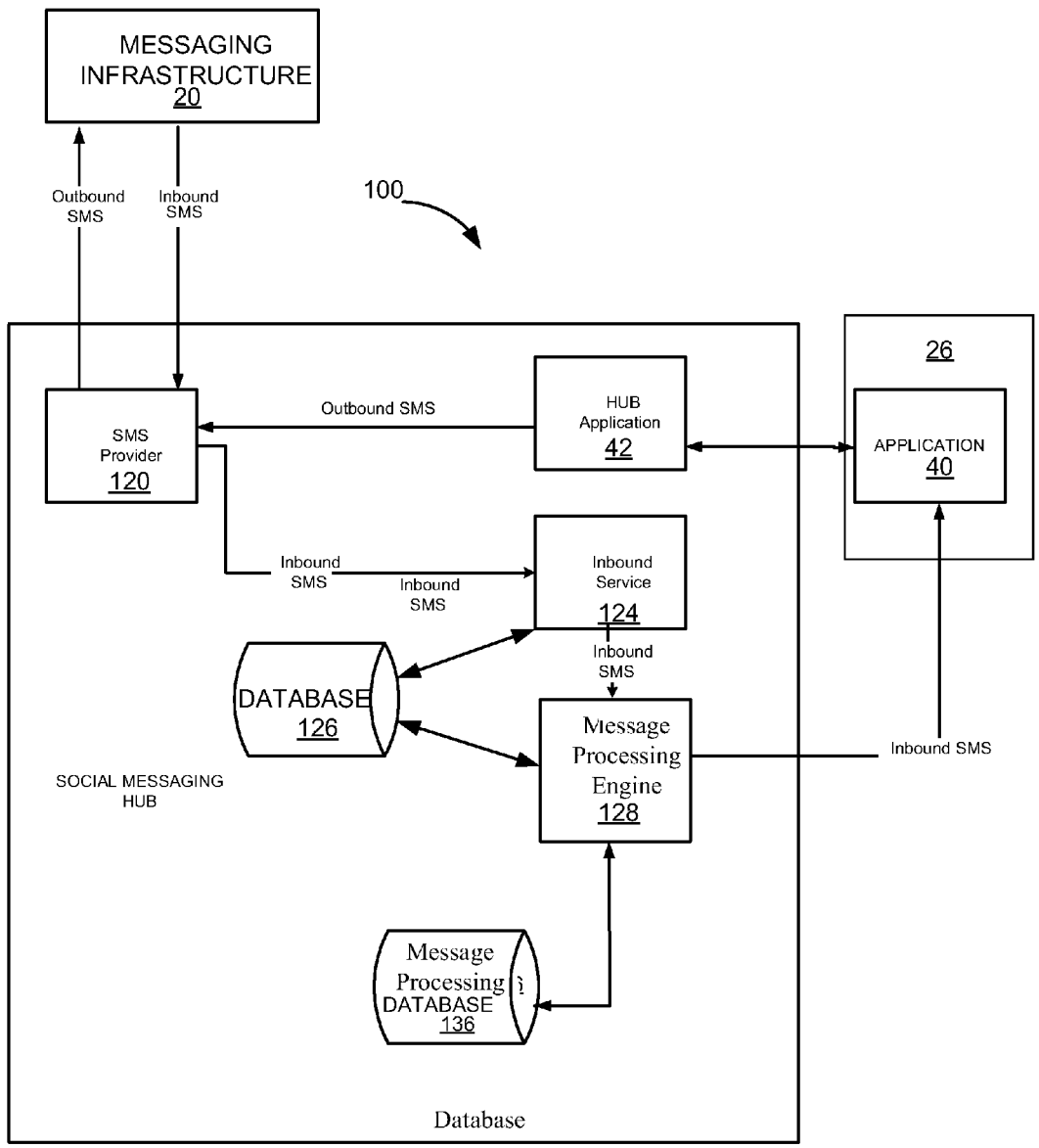
FIG. 3 is a schematic illustration of a text handling subsystem.
Figure 4:
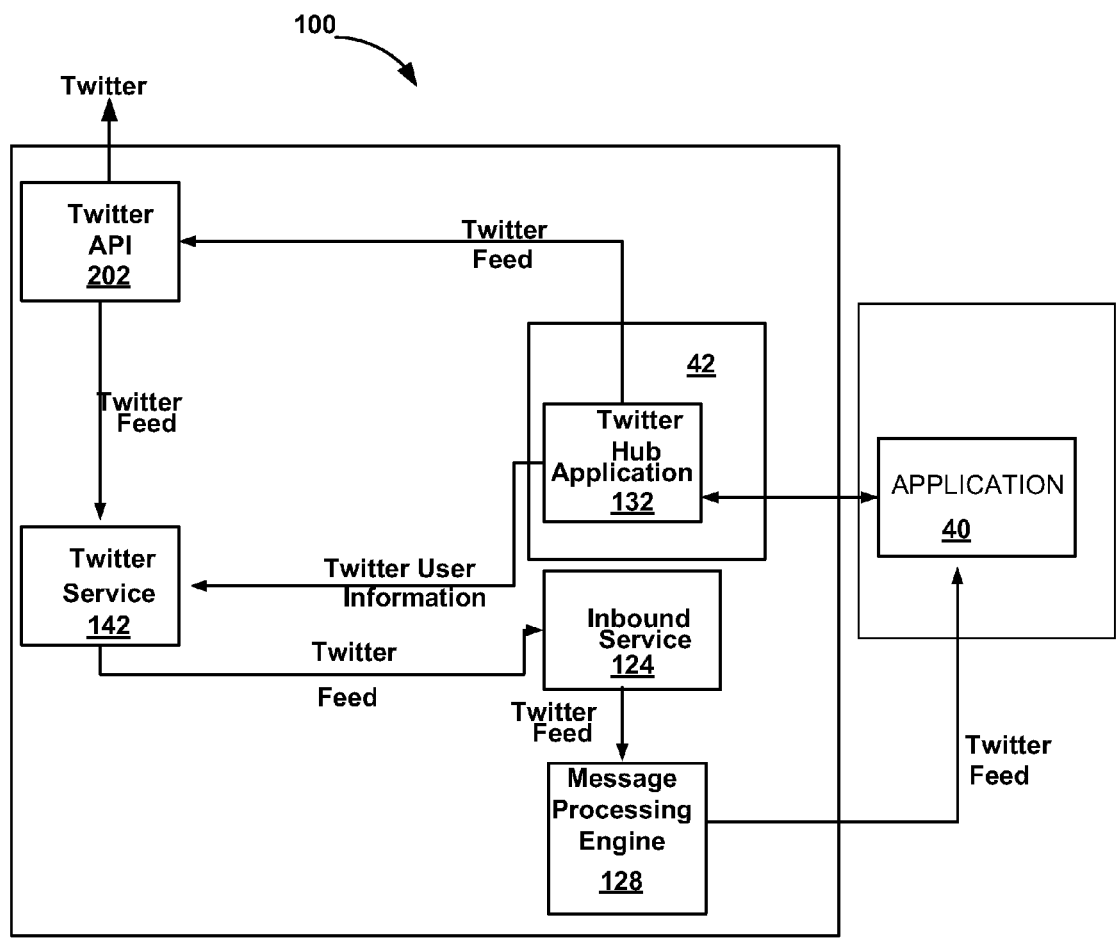
FIG. 4 illustrates details an embodiment of the social messaging hub of FIG. 1 configured for Twitter messaging.

FIG. 3 illustrates further details of the text message-handling subsystem of the social messaging hub 100. A web client 38 operating on a data enabled device 26, connects to the social messaging hub 100. After user login and authentication, the Hub application 42 initiates a persistence connection (i.e., using the same Transmission Control Protocol (TCP) connection to send and receive multiple Hypertext Transfer Protocol (HTTP) requests/responses) to the message processing engine 128. As described above, the application 40 can be either a web client 38 (e.g., browser) or an app running on a data enabled device 26.

Outbound SMS/MMS messages are sent to the SMS provider 120 which in turn relays the message to the messaging infrastructure 20 (e.g., SMS Aggregator 14 or the SMSC 12). It is the responsibility, for example, of the SMSC 12 to send this message to the receiving party's (addressee's) device. Inbound SMS/MMS/EMS messages for a user of the social messaging hub 100 are received by the SMS provider 120 from the SMSC 12. The SMS provider 120 relays the message to an inbound service 124 which stores the message in the social messaging hub 100 database and also relays it to the message processing engine 128. The message processing engine 128 sends this message to the subscribed application 40 if an active session is available. If an active session is not available, the messages are stored in queue for delivery upon next login of the recipient Now referring to FIG. 4, in one embodiment, a social messaging hub 100 includes the Twitter service 142 subsystem and the Twitter API 202. The Twitter service 142 subsystem can provide a web or application interface, Twitter Hub Application 132. In operation, the application 40 on the data enabled device 26 connects to the Twitter hub application 132. In the case of PC, the Twitter hub application 132 provides a web application to run in conjunction with a browser on the data enabled device 26. In one embodiment, the user uses a short code (e.g., 40404) and sends an SMS message "Start" in establish a connection with the Twitter Service 142. The user then can proceed to send and receive "Tweets" via SMS messaging.

When used from a data enabled device 26 operating a web browser, a web client 38 connects to the Twitter Service 142 through the web server 152 running the Twitter Hub application 132 component of the Hub application 42. After user login and authentication, the user opens a Twitter Panel, and the Twitter Hub application 132 displays recent Twitter feeds to the user. The web server 152 sends the Twitter user information to the Twitter service 142 (also referred to a SocialServicePolling web service) which polls the Twitter service through a Twitter API 202 periodically for feed updates. When a new feed is received from Twitter, the Twitter service 142 forwards the feed to the web server 152 through the inbound service 124. The inbound service 124 relays this feed to the message processing engine 128 which sends the feed to the subscribed web client 38 if it is connected.

The social messaging hub 100 implementation of Twitter messaging advantageously enables users of the social messaging hub 100 to receive the 'Tweets' of the people that they are following on Twitter via SMS on a global basis with no regard to national country borders. In conventional implementations service, a person can only receive the Tweets of the people they are following on Twitter via SMS within the home/native country of their mobile carrier provider. For example, if a local carrier is the providing mobile carrier for a user, once the person leaves the US, the Tweets delivered by SMS directed to the user's mobile phone are not delivered. This is due partly to cost, partly business contracts (lack of contracts between Twitter and mobile carriers) and technology limitations.

Using the assigned unique identifier, the user can use multiple devices in conjunction with the unique identifier to send and receive messages worldwide without having to constantly change messaging services. The Facebook service 144 operates in a manner similar to the Twitter Service 142 described above in conjunction with FIG. 4. The common message conversation queue 130 enables personal replies to be threaded back to the user's social inbox so individual chat conversations can continue across multiple data enabled devices to provide multi-screen messaging. The user can also use a Group Message feature by sending text and chat messages out to Facebook, IM's and through SMS to contacts in the user's mobile address book. Texting conversations follow users from the Facebook App to their smartphone or tablet and vice versa. A user can read a message from anywhere and respond on any device with the same phone number.

In another embodiment (not shown), the social messaging hub 100 provides the ability to send and receive SMS message with a user's own phone number from within the user's Facebook account. A Facebook application executes within Facebook to utilize SMS with the user's assigned phone number for sending and receiving SMS. The Facebook application logs onto servers 152 in the social messaging hub 100, establishing an 'IP session' while the user is within Facebook. Operationally this is similar to when the user is connected to the social messaging hub 100 from a data enabled device 26 with an IP connection, but the messages are received from and delivered to the Facebook application. The connection of the Facebook application to the social messaging hub 100 allows a Facebook user to send and receive SMS from within Facebook without having to exit Facebook. Other users in the outside world are not aware of whether the user is in Facebook or on their phone or other data enabled device 26.

Figure 5:
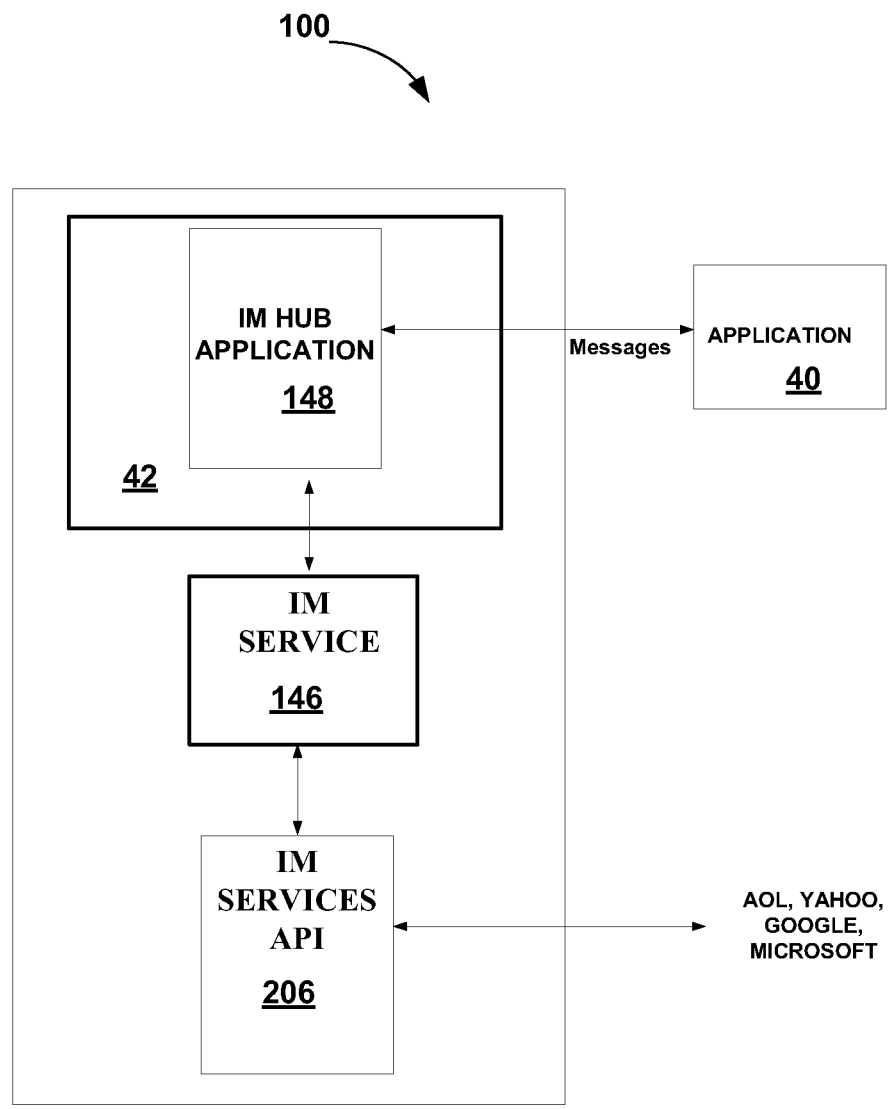
FIG. 5 illustrates details an embodiment of the social messaging hub of FIG. 1 configured for IM messaging.

Now referring to FIG. 5, in another embodiment, a social messaging hub 100 includes an Instant Messaging (IM) service 146 and an IM Hub application 148 component of the Hub application 42. In operation, the web client 38 connects to the web server 152 which is running the IM Hub application 148. After user login and authentication, and the user opens an IM Panel (supplied by the social messaging hub 100) in the web client, the user is authenticated by the IM web site. Once authenticated, the user can chat with friends through the IM panel. The chat messages are not handled directly by the social messaging hub 100 but are handled by IM services 146. Only the social messaging hub 100 web page is used to send and view the chat messages.

Figure 6:
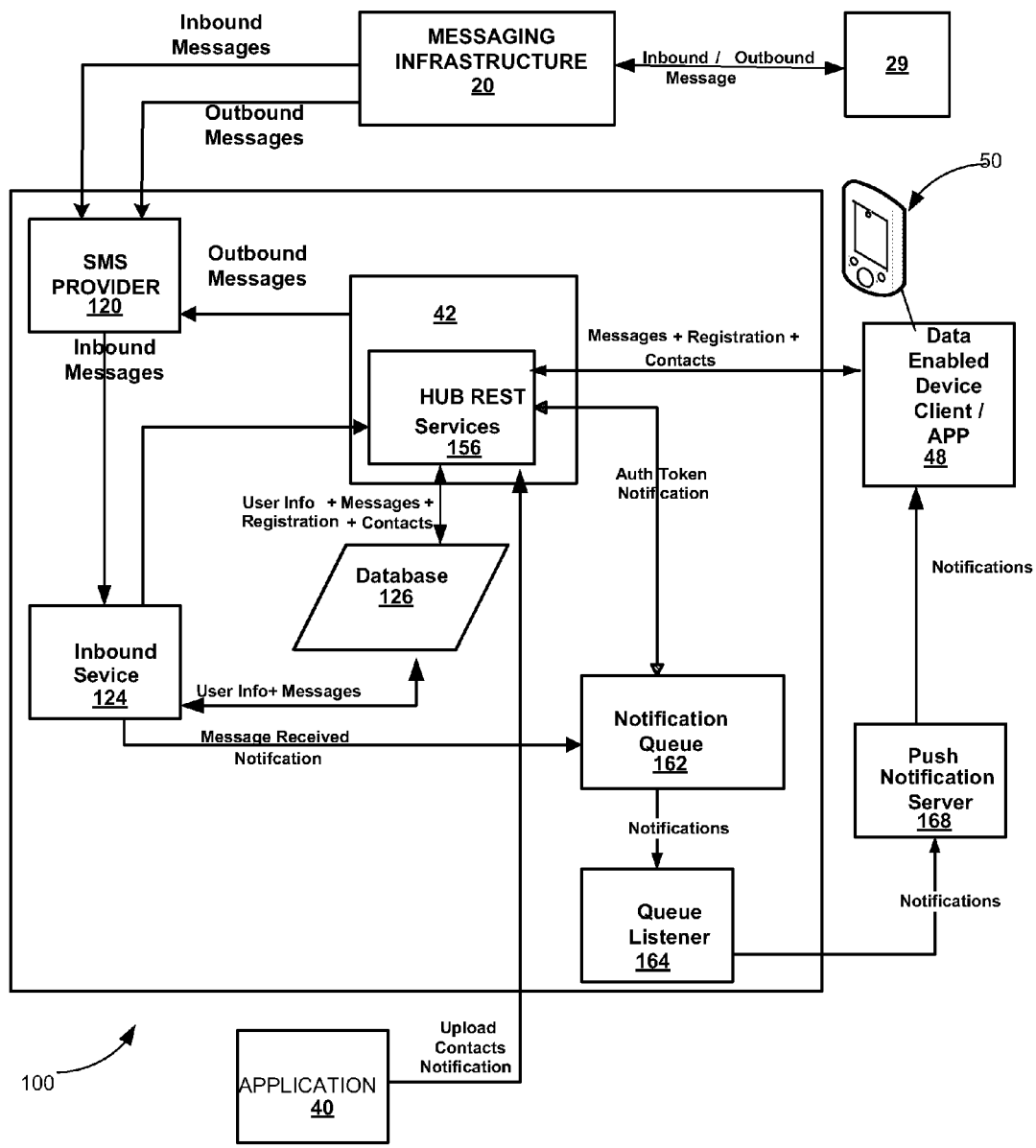
FIG. 6 illustrates details of an embodiment including a push notification service.

Additionally, presence information with regard to the user's IM service address book is communicated through the social messaging hub 100 IM service 146 and displayed in the user's address book for the IM service. The IM services include IM communication using for example AIM, Yahoo Messenger, Windows Live Messenger and GoogleTalk, Now referring to FIG. 6, another embodiment of a social messaging hub 100 operates with smart phones 50 and other data enabled devices 26 having additional messaging and application features supported by the mobile carrier provider and the phone manufacturer. Examples of such smart phones include smart phones running the Android™ operating system and Apple Corporation's iPhones and iPods. The social messaging hub 100 includes a set of Representational State Transfer (REST) web services 156 (also referred to as REST web services 156). The social messaging hub 100 further includes a notification queue 162 and a queue listener 164 which is interfaced to an external Push notification server 168.

The smart phone client/app 48 communicates with the social messaging hub 100 via the REST web services 156. The first time the smart phone 50 runs the smart phone app 48, the application requests an Auth Token from the REST service. The Auth Token is delivered by the web service via the Push Notification Server 168. This Auth Token is stored by the smart phone app 48 and passed to the Push Notification service with every subsequent call for verification/security purpose.

After getting the Auth Token, the smart phone app 48 requests a telephone number. This number is then used by the smart phone app 48 to send and receive SMS/MMS/EMS messages. The REST web services 156 deliver a unique identifier (e.g., a telephone number) and also create a User login account that can be used for logging onto the web/application. The inbound messages enter the social messaging hub 100 through the SMS provider 120, which connects to the inbound service 124. The inbound service 124 pushes out a Message Received notification via the Push Notification Server 168 using the notification queue 162 and the queue listener 164. When the smart phone app 48 gets the Message Received Notification, it retrieves the message from the social messaging hub 100 through a connection to the social messaging hub 100 REST services 156. All the notifications are delivered to the Notification Queue 162, from where they are picked up by the Queue Listener 164 and delivered to the Push Notification Server 168. The Hub application 42 can initiate a request to upload contacts from the smart phone 50. This request goes through the notification server 168 and the smart phone app 48 uploads the contacts by calling the REST service 156. Uploaded contacts allow the social messaging hub 100 to cross reference the contacts allowing a user to send a message via name and be notified of a received message by name instead of phone number. Additionally locator/tracking features by name are enabled by contact information. Outbound messages are process by the REST web services 156 as part of the Hub application 42. The messages are transferred to the SMS provider 120 for delivery through the messaging infrastructure 20.

To insure that a text message is delivered to the right device and to prevent anyone spoofing the address when a push notification is not available, the social messaging hub 100 architecture utilizes a session based communications model requiring authentication by login with userid and password registered devices or a non-registered device is being used (e.g.—a PC), Thus, it is virtually impossible to have a combination of an unregistered, unauthorized, or unrecognized device receive messages without some form of legitimate userid/password combination to establish the session.

In one specific embodiment supporting the Apple iOS environment (i.e., Apple iOS devices, iPhone, iPod touch, iPad etc.), the Push Notification Server 168 is an Apple Push Notification Server. When used with a smart phone such as an iPhone, a Droid a Windows Mobile-based phone, or any phone having a GPS chip, the system may also be configured with a safety or monitoring application. In one such configuration, the system accesses the GPS chip of the mobile device, and if the user or account holder (such as a parent paying the telephone bill) so elects, the social messaging hub 100 client application may be set to disable the sending/receiving of SMS/MMS. In one embodiment, the social messaging hub 100 in conjunction with application 40 provides the geographic distance of a user's contacts from the user's present location. In addition, use of cell tower triangulation data in combination of IP geo-location estimation provides a 3-way or 2-way or 1-way estimation of geographic location.

Figure 7:
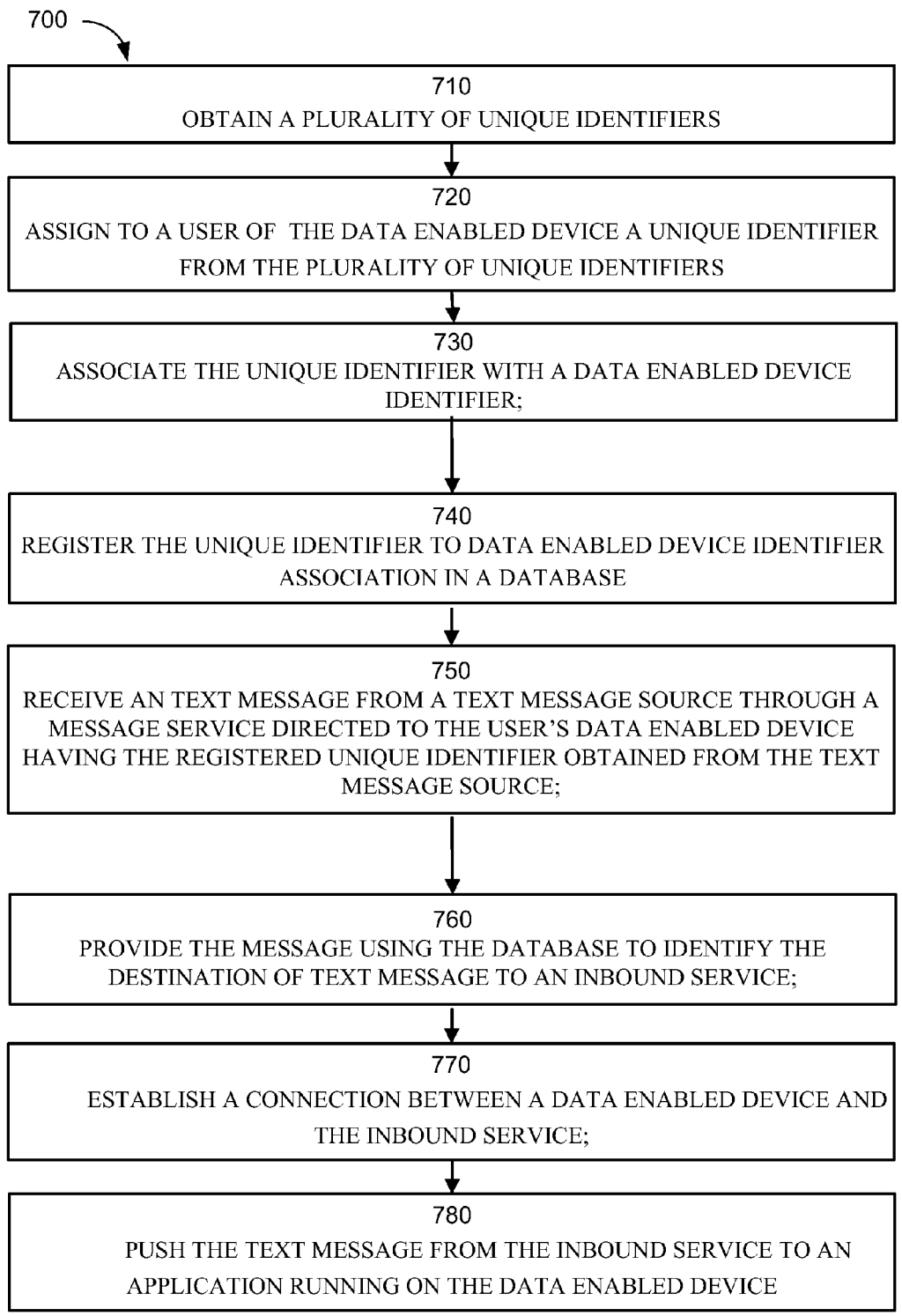
FIGS. 7-9 are flow charts of processing steps performed to register data enabled devices and affect social media and SMS messaging among these devices and mobile phones through a messaging infrastructure in accordance with embodiments disclosed herein.

In FIG. 7, flowchart 700 diagrams the overall process of the transmission and reception of SMS messages facilitated by the social messaging hub 100. In step 710 the social messaging hub 100, obtains a plurality of unique identifiers. In step 720, a user of the data enabled device 26 is assigned a unique identifier from the plurality of unique identifiers. In step 730, the unique identifier is associated with a data enabled device identifier, and in step 740, the unique identifier to data enabled device identifier association is registered in the database 126.

In step 750, a message is received from a message source through a message service in the messaging infrastructure 20 directed to the user's data enabled device 26 having the registered unique identifier obtained from the message source. In step 760, the message is provided by the SMS Provider 120 using the database 126 to identify the destination of message to an inbound service 124. In step 770, a connection is established between the data enabled device 26 and the inbound service 124, and finally in step 780, the message is pushed from the inbound service 124 to an application running 40 on the data enabled device.

Figure 8:
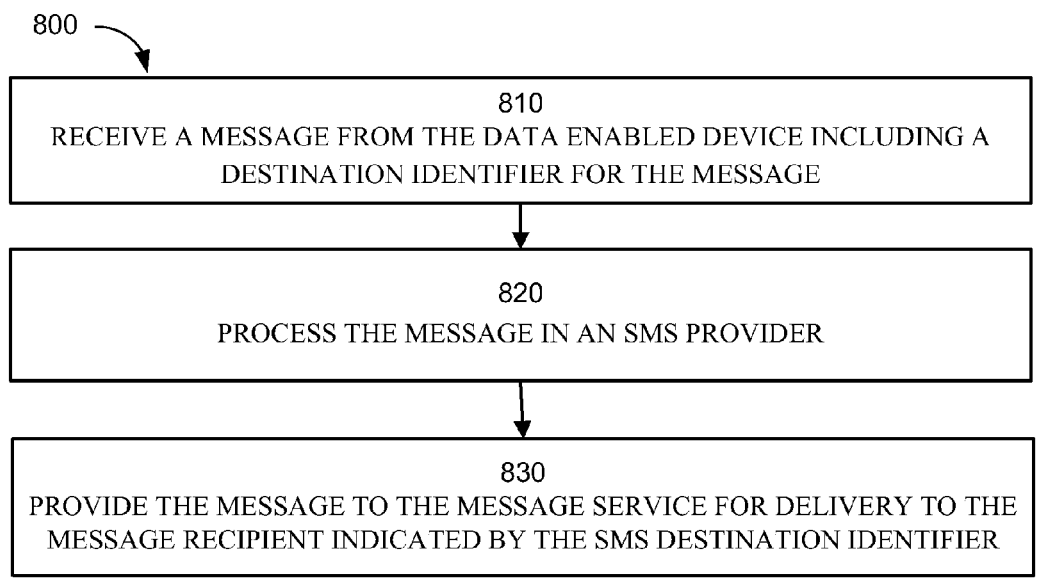

FIG. 8 diagrams the overall process of the transmission of SMS messages facilitated by the social messaging hub 100. In step 810 the social messaging hub 100 receives a message from the data enabled device including a destination identifier for the message. In step 820, the message is processed in the SMS provider 120 which determines the best delivery route through the messaging infrastructure 20, and in step 830, the message is provided to the appropriate message service in the messaging infrastructure 20 for delivery to the message recipient indicated by a SMS destination identifier.

Figure 9:
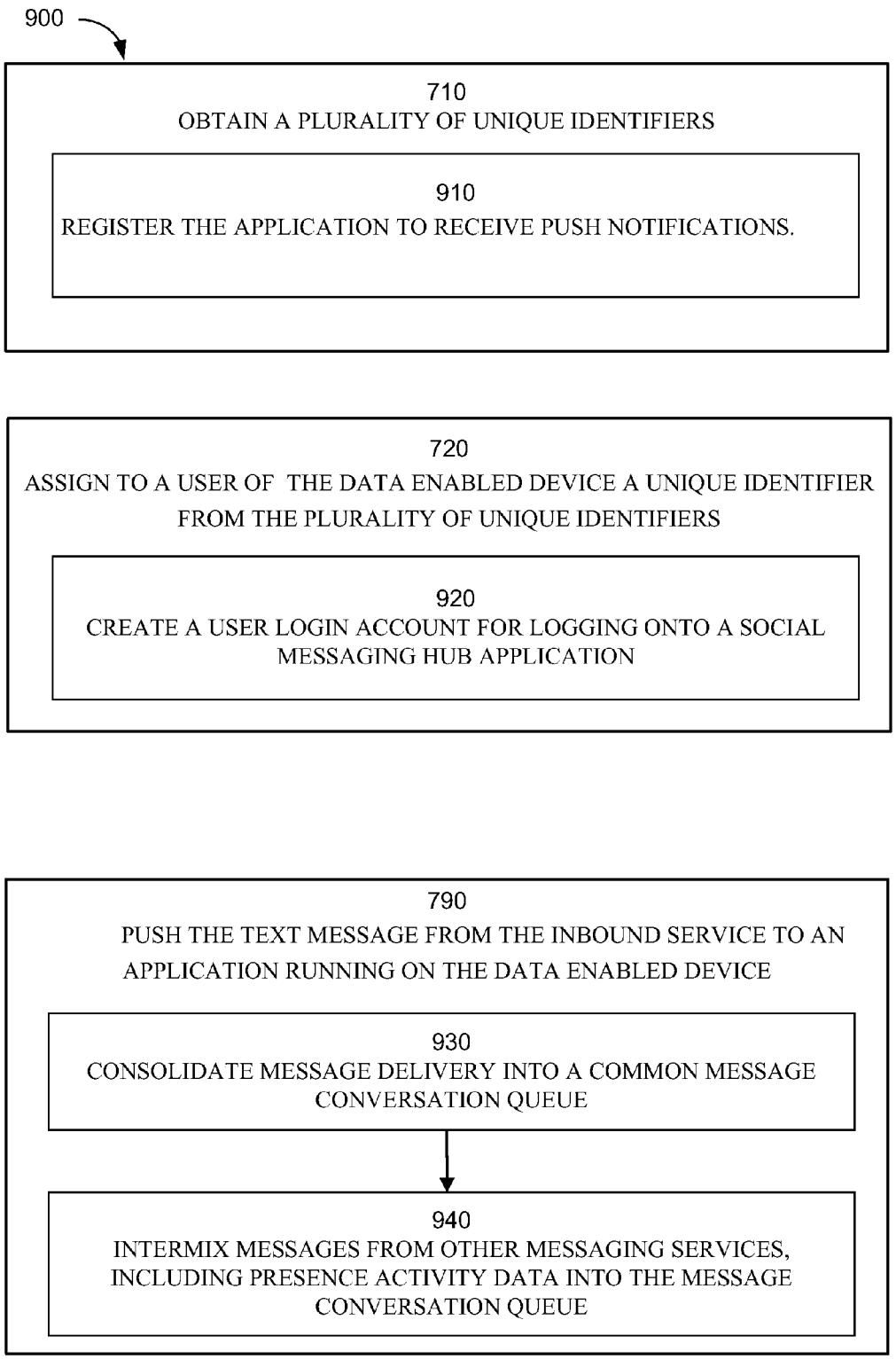

FIG. 9 illustrates additional steps performed by the social messaging hub 100. In step 910, in the case of certain devices the subscribing process includes registers the application 40 to receive push notifications. For example, the app running on an iPhone or iPod Touch is registered to receive Apple Push Notifications as part of the process to receive SMS messages on the iPhone or iPod Touch.

In one embodiment, the step of assigning a user a unique identifier includes creating a User login account for logging onto the social messaging hub application 100 at step 920. A user supplied email address supplied as part of the registration process for contact purposes is combined with the unique registered phone number. Such a combination of two unique identifiers, each supplied by separate parties provides a unique identification that can be located in a connectionless manner on the Internet.

In step 930, message delivery is consolidated into a single common message conversation queue, followed by step 940 where the intermixing messaging services and presence activity data are intermixed into the single common message conversation queue 130.

Multiple Telephone Number and IP Address Account Capability

Embodiments disclosed herein provide the ability to utilize multiple telephone numbers and/or IP based address accounts on a single account/software/hardware device without having to setup or utilize different account/software clients/hardware device, including dual/multiple SIM devices. This capability is provided in a new feature that enables a person to have/assigned multiple telephone numbers that enables on a single device (e.g.—iPhone, tablet, iPod, smartdevice, etc.) with the same software application client.

For example, an international traveler or even vacation traveler, has a US+1 telephone number, a UK+44 telephone number and a Hong Kong+852 telephone number, all simultaneously. When communicating with someone in the US, UK or HK, the user can selects and provide the telephone number for that country, saving international rates that would be the norm if using a 'foreign' telephone number.

Conventional solutions for international travelers include dual SIM card mobile phones. Unfortunately this solution is difficult to implement and has an awkward human interface. Two SIM cards limit the number of multiple telephone numbers that can be associated to the device.

Previously having multiple telephone numbers from different countries on same device/same software client was unavailable due to restrictions involving mobile network operators (MNOs) (also known as mobile phone operator, or simply mobile operator or mobo) being country specific (e.g., —ATT is a US operator; and even MNO's where they operate in multiple countries, e.g.—Vodafone, each Vodafone entity in a country operates as a separate operating company issuing only that country's telephone numbers).

Figure 10:
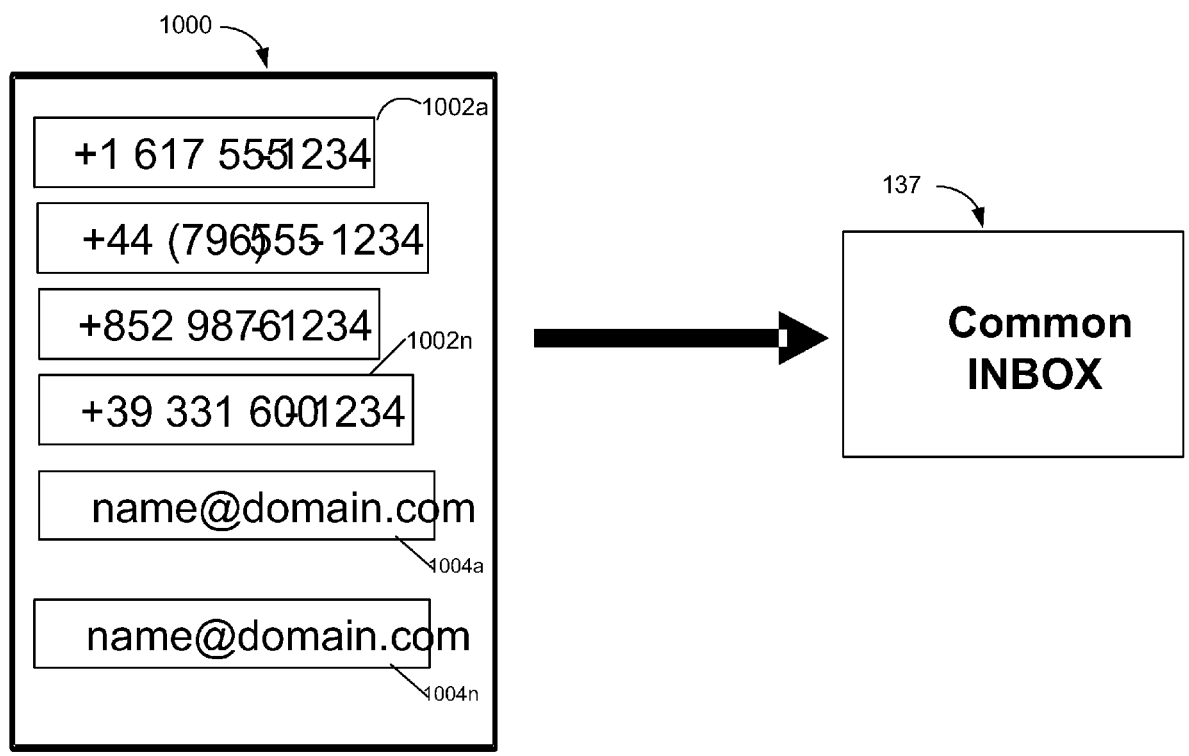
FIG. 10 illustrates the operation of a common inbox in accordance with embodiments disclosed herein.
Figure 11:
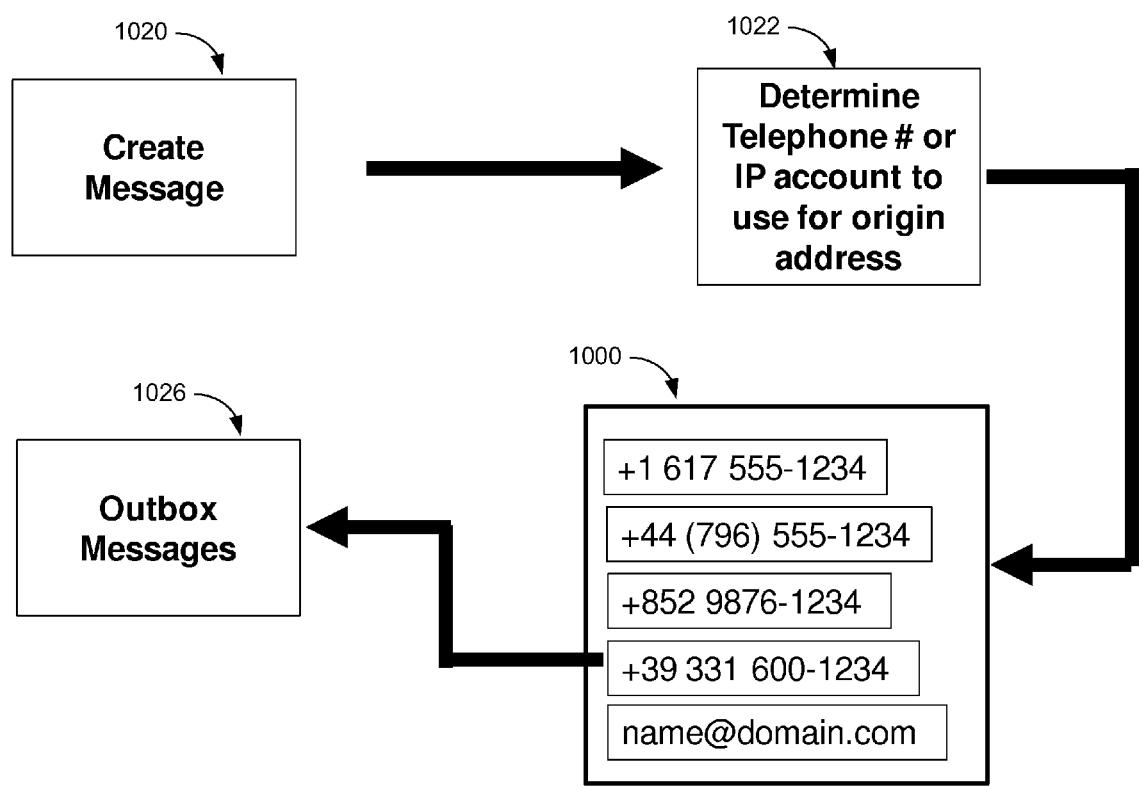
FIG. 11 illustrates the steps of determining a telephone number of IP account to use for an origin address in accordance with embodiments disclosed herein.

In one embodiment as shown in FIGS. 10 and 11, through a data enabled device 26, application 40 and corresponding software user interface, the user has the ability to have: multiple telephone numbers 1002a-1002n and multiple IP based address accounts 1004a-1004n. incoming messages directed to any one of the collective addresses 1000 are received in a single common Inbox 137. Outgoing messages are created in step 1020, and a determination is made in step 1022 as to what telephone number or IP account to use for the origin address of the message from the list of collective address 1000. finally the message is sent to an outbox in step 1206.

The message is sent with an origin address based on criteria set by user such as:
Destination address or recipient(s);
Current geo-location of user;
User telephone number account preference;
Billing accounts and billing codes;
Servers, for example servers from a particular service, such as AIM, HeyWire;
User names; and
Networks (e.g., —the Comcast network, the Verizon network, Vodafone network, etc.) and network status (e.g., home vs. roaming, 3G vs. WiFi, etc.).

Dual Mode Phone Support

In addition to conventional GSM or CMDA mobile phones manufacturers are now adding a Wi-Fi capability to mobile phones. For example, GSM/Wi-Fi dual-mode IP phones are now available from several manufacturers. Also available are GSM mobile phones with the ability to accommodate multiple Subscriber Identity Module cards (SIM cards).

Figure 12:
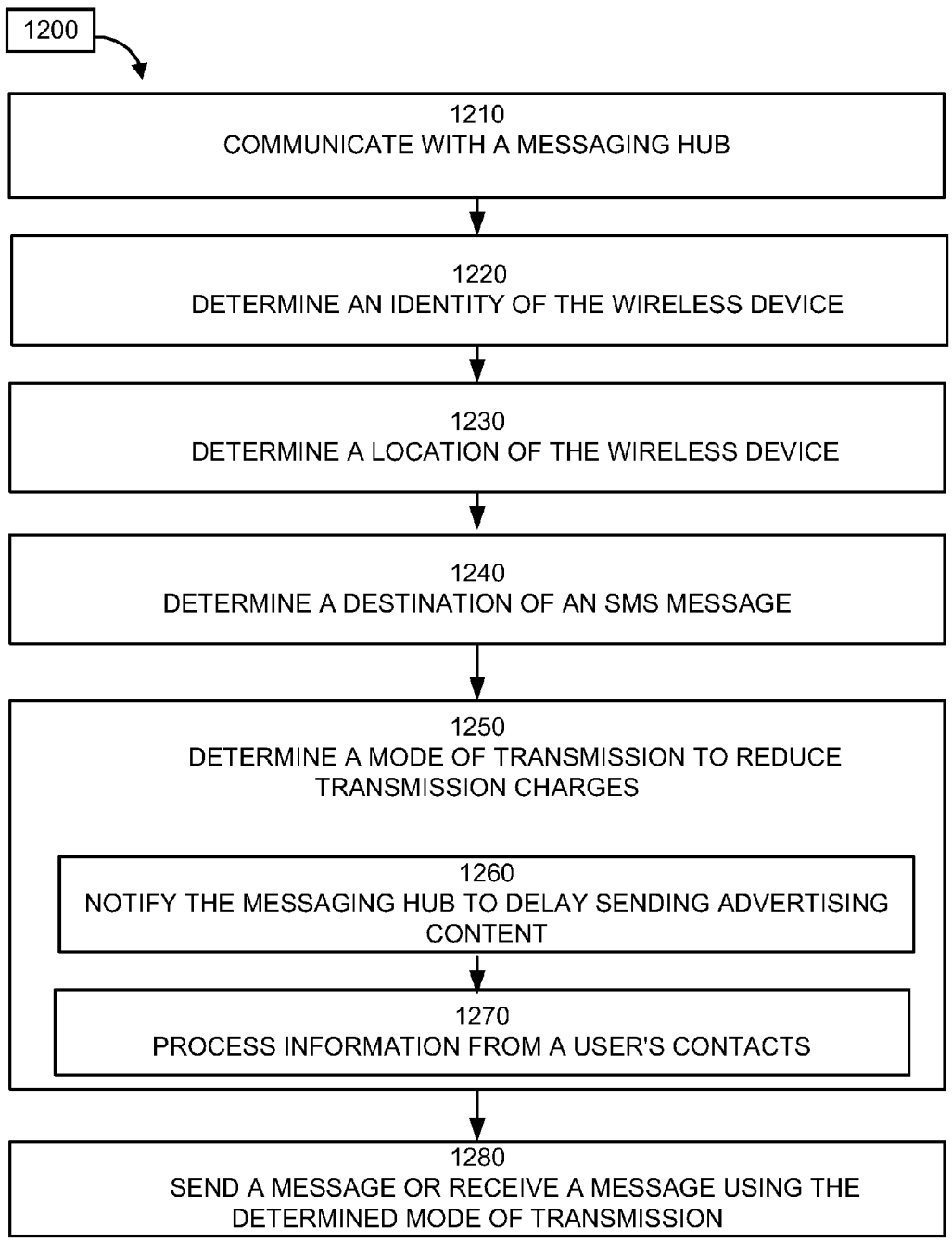
FIG. 12 is a flow chart of processing steps performed to determine a mode of transmission to reduce transmission charges in accordance with embodiments disclosed herein.

FIG. 12 illustrates in flowchart 1200, the steps performed the interface management program 135 in conjunction with the transmission mode selector 131 to determine a mode of transmission to reduce transmission charges. In step 1210, the interface management program 135 communicates with the transmission mode selector 131 in the social messaging hub 100. For example, the app running on an iPhone or iPod Touch contacts the social messaging hub 100 during initialization before sending a message. At step 1220 the identity of the data enabled wireless device 26 is determined along with its location in step 1230. At step 1240, the destination address of an SMS message is determined. Using the information gathered in the previous steps the transmission mode selector 131 in conjunction with the application 40 determine a mode of transmission to reduce transmission charges in step 1250. The determination can include notifying the messaging hub to delay sending advertising content at step 1260, using a Wi-Fi connection or choosing between one of several phone numbers (and corresponding carriers) to send or receive messages. In step 1280, a message is sent or received using the determined mode of transmission.

The application 40 can transmit SMS messages via a Wi-Fi Internet connection in any device which is Wi-Fi enabled or via an Internet data connection in a 3G or 4G or (Long-Term Evolution) LTE mobile phone or other 3G or 4G or LTE enabled devices (e.g., the Amazon Kindle Reader, Apple iPad, etc). In certain embodiments the application 40 takes advantage of this Wi-Fi capability in dual mode phones to provide cost-optimized content control and cost-optimized call connections. The application 40 can also process information from a user's contacts to further enhance the cost-optimized content control and cost-optimized call connections features, by determining the most cost effective method and routing path to send and receive SMS text messages, and other associated data items (e.g., advertisements, meta data, etc).

When traveling internationally and using a mobile device provisioned with a user's home/local carrier, the transmission and reception of SMS messages and the reception of advertising content can be quite expensive. One way to reduce these costs is to provision the mobile device with a SIM card which provides service in a particular country to be visited, to use a so called international SIM card or to use a multiple SIM card phone. However, even with a SIM card, there is typically a charge for SMS text messages or for a data plan with a restricted data allotment (typically monthly). In the absence of a Wi-Fi connection, the application uses a portion of the data allotment usually monthly even when sending free SMS text messages.

As described above, advertising content is provided through the application 40. Ads comprise iAds, or clickable banner ads, which can either link to a phone-optimized microsite, a Web page. Clicking on the ad takes you to this microsite. This advertising monetizes the application and the revenue offsets the cost of operating the HeyWire service. Advertising can be turned off when the connection is made through the mobile carrier's data network when an IP connection to free Wi-Fi service is not available. Some of the parameters involved in making a determination whether to receive ads are: Wi-Fi connectivity, cost of Wi-Fi service, details of a user's data plan, roaming charges, etc. In one embodiment the app 40, once installed, prompts the user having a dual mode phone to specify SIM card numbers, the availability of Wi-Fi connectivity, costs, data plan details etc.

Additionally, country-appropriate promotional material is provided to the device by the Wi-Fi Internet connection when a mobile phone is operated abroad.

When traveling outside a home region or country, SMS and data plans are generally charged at much higher rates associated with roaming. For example, the rates associated with data plans while roaming can be orders of magnitude more costly than non-roaming rate. When roaming, SMS text messages outside of the users home region or home country, are charged at international rates (e.g.—US $0.50 roaming vs. US $0.02 local per msg). Therefore the ability to switch to a Wi-Fi Internet connection would save a user a considerable amount on SMS messaging charges.

In one aspect of the invention, a personal communication device includes multiple communications modes including telephony and Internet communication interfaces either through a Wi-Fi connection or through a carrier data interface, and the device includes an interface management program 135 (which can be incorporated in an application). The interface management program 135 in conjunction with the transmission mode selector 131 can effectively minimize costs incurred when sending or receiving SMS or other text messages and can determine whether to block or delay the reception of advertising content. In one embodiment, the transmission mode selector 131 in conjunction with the application 40 notifies the messaging processing engine 128 not to send the advertising content.

In response to a determination about location, availability and cost of Wi-FI service, a recipients address (e.g., location or phone number), the interface management program 135 is operative to effect transmission (locally or internationally) via Internet (through Wi-Fi or data interface of the mobile device). Alternatively, the interface management program 135 can determine that a message should be sent through the normal transmission path provided by the mobile carrier. The interface management program 135 and the transmission mode selector 131 can automatically recognize destination of a SMS message and transmits such message by a mode so as to avoid roaming charges, or data charges.

While configurations of the system and method have been particularly shown and described with references to configurations thereof, it will be understood by those skilled in the art that various changes in form and details may be made therein without departing from the scope of the invention. As an example, the order of processing steps in the flow charts is not limited to the order shown herein. Accordingly, the present invention is not limited by the example configurations provided above.

What is claimed is:

1. A method for selecting a wireless device mode of transmission comprising:
communicating with a messaging hub;
determining an identity of the wireless device;
determining a network status of the wireless device;
determining a destination of an SMS/MMS/EMS message; and
using the destination determination and network status determination to determine a mode of transmission of the SMS/MMS/EMS message to reduce transmission charges;
receiving a plurality of incoming SMS/MMS/EMS messages directed to a plurality of user accounts;
receiving the plurality of incoming SMS/MMS/EMS messages in a single Inbox; and
sending each of the plurality of incoming SMS/MMS/EMS messages to the wireless device using the determined mode of transmission; and wherein at least one of the plurality of the user accounts corresponds to a virtual telephone number registered on the messaging hub and associated with an IP address and corresponding MAC address.

2. The method of claim 1, wherein determining a mode of transmission to reduce transmission charges includes notifying the messaging hub to delay sending advertising content.

3. The method of claim 1, wherein determining a mode of transmission to reduce transmission charges includes processing information from a user's contacts.

4. The method of claim 1, wherein the mode of transmission is transmission using a foreign carrier.

5. The method of claim 1, wherein the mode of transmission is a Wi-Fi mode and wherein the Wi-Fi mode of transmission uses one of a plurality of IP based address accounts registered in the messaging hub and associated with a corresponding one of plurality of telephone numbers.

6. The method of claim 1, wherein determining the mode of transmission to reduce transmission charges includes determining the mode of transmission to minimize roaming charges.

7. The method of claim 1 further comprising associating a specific telephone number as a message origination telephone number from a list of collective addresses as a function of user criteria.

8. The method of claim 7, wherein the user criteria includes at least one of:

a billing account; and a billing code.

9. The method of claim 1, wherein the network status includes one of:

a roaming status; and previous band width usage.

10. The method of claim 1 further comprising:

sending outgoing SMS/MMS/EMS messages based on user selectable criteria including at least one of:

a destination address;

a recipient; and a user telephone number account preference.

\* \* \* \* \*